United States Patent [19]

Carver

[11] Patent Number: 4,557,608
[45] Date of Patent: Dec. 10, 1985

[54] THERMAL MICROSTRUCTURE MEASUREMENT SYSTEM

[75] Inventor: Michael J. Carver, Bay St. Louis, Miss.

[73] Assignee: The United States of America as represented by the Secretary of the Navy, Washington, D.C.

[21] Appl. No.: 608,740

[22] Filed: May 10, 1984

[51] Int. Cl.$^4$ .................... G01K 7/22; G01K 1/14; G01D 21/00

[52] U.S. Cl. ................... 374/170; 73/300; 340/870.17; 374/183; 441/11

[58] Field of Search .......... 374/170, 142, 143; 73/300, 291, 292, 170 A

[56] References Cited

U.S. PATENT DOCUMENTS

| | | | |
|---|---|---|---|
| 3,301,047 | 1/1967 | Von Wald et al. | 73/170 A |
| 3,405,558 | 10/1966 | Koot | 73/170 A |
| 3,695,103 | 10/1972 | Olson | 73/170 A |
| 3,765,236 | 10/1973 | Erdely | 73/170 A |
| 3,926,056 | 12/1975 | Brown | 374/143 X |
| 4,227,185 | 10/1980 | Kronlage | 374/185 X |
| 4,307,605 | 12/1981 | Niskin | 73/188 X |
| 4,308,749 | 1/1982 | Clavelloux et al. | 73/170 A |
| 4,359,285 | 11/1982 | Washburn | 73/170 A |
| 4,448,068 | 5/1984 | Sutherland et al. | 73/170 A |

Primary Examiner—Daniel M. Yasich
Attorney, Agent, or Firm—R. F. Beers; H. A. David; Francis I. Gray

[57] ABSTRACT

A thermal microstructure measurement system (TMMS) operates autonomously with its own internal power supply and telemeters data to a platform. A thermal array is mounted on a cross-braced frame designed to orient itself normal to existing currents with fixed sensor positioning bars protruding from the cross bars. A plurality of matched thermistors, conductivity probes and inclinometers are mounted on the frame. A compass and pressure transducer are contained in an electronics package suspended below the array. The array is deployed on a taut mooring below a subsurface float. Data are digitized, transmitted via cable to a surface buoy and then telemetered to the platform where the data is processed via a computer, recorded and/or displayed. The platform computer also sends commands to the array via telemetry.

6 Claims, 8 Drawing Figures

THERMAL MICROSTRUCTURE MEASUREMENT SYSTEM

ORIGIN OF THE INVENTION

The invention described herein was made in performance of work under a NASA Contract, and is subject to the provisions of Section 305 of the National Aeronautics and Space Act of 1958, Public Law 85-568 (72 Stat. 435, 42 U.S.C. 2457).

BACKGROUND OF THE INVENTION

1. Field of the Invention

The present invention relates to oceanographic instrumentation, and more particularly to a thermal microstructure measurement system for obtaining temperature data from a planar array of sensors in shallow water to determine sound speed in the water column.

2. Description of the Prior Art

Current conductivity-temperature-depth (CTD) devices are lowered from a stationary ship, and a recorder on board simultaneously records measurements of temperature, salinity (conductivity) and depth. These devices use a single thermistor referenced to an accurate platinum resistance device which is expensive, require cable connection to the ship, and are winched up and down to obtain profile data. What is desired is an autonomous system which can produce a three-dimensional data acquisition of current flow.

SUMMARY OF THE INVENTION

Accordingly, the present invention provides a thermal microstructure measurement system (TMMS) which operates autonomously with its own internal power supply and which telemeters data to a platform. The thermal array is a cross-braced frame designed to orient itself normal to existing currents with fixed sensor positioning bars protruding from the cross bars. A plurality of matched thermistors and conductivity probes, and a recording inclinometer are mounted on the frame. A compass and pressure transducer are contained in an electronics package suspended below the array. The array is deployed on a taut mooring below a subsurface float. Data are digitized, transmitted via cable to a surface buoy and then telemetered to a platform where the data is processed via computer, recorded and/or displayed. The platform computer also sends commands to the array via telemetry.

Therefore, it is an object of the present invention to provide an autonomous thermal microstructure measurement system to obtain a three-dimensional data representation of current flow.

Other objects, advantages and novel features will be apparent from the following detailed description when read in conjunction with the appended claim and attached drawing.

DESCRIPTION OF THE PREFERRED EMBODIMENT

Figure 1:
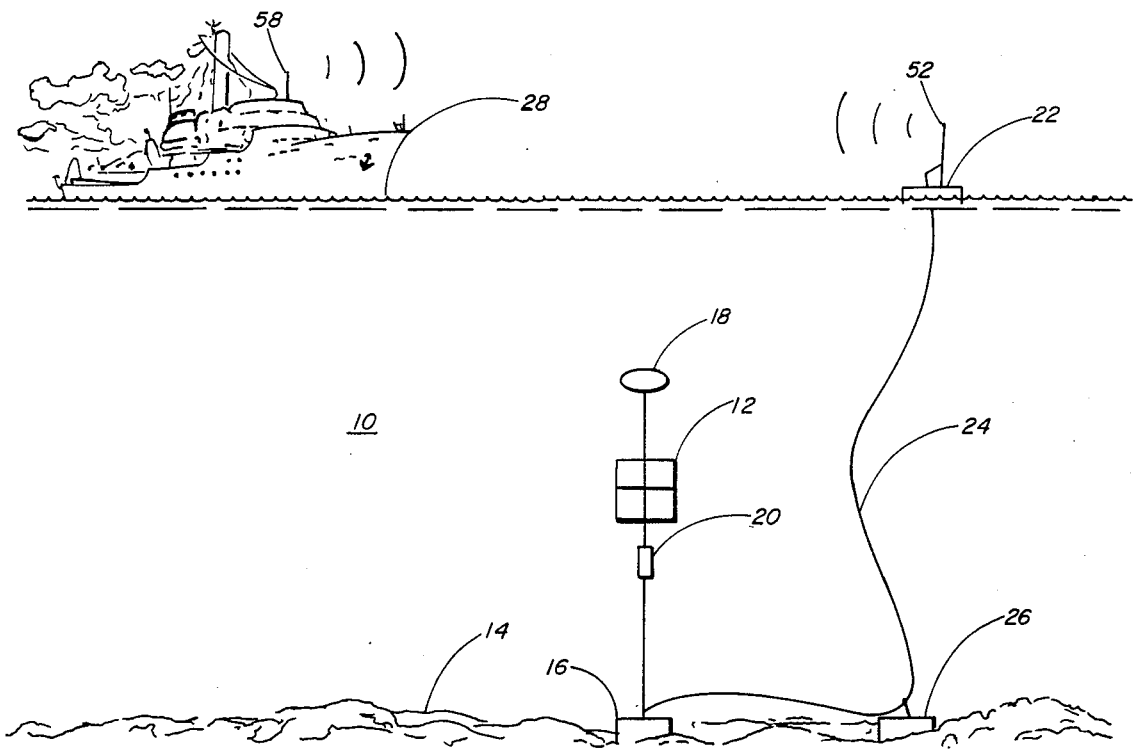
FIG. 1 is a pictorial view of a thermal microstructure measurement system (TMMS) when deployed according to the present invention.

Referring now to FIG. 1 a thermal microstructure measurement system (TMMS) is deployed in the ocean 10. A planar array 12 is tautly moored to the sea floor 14 between an anchor 16 and a subsurface float 18. Below the array 12 is an electronics package 20. A surface buoy 22 is connected via a cable 24 to the electronics package 20. A second mooring anchor 26 for the surface buoy 22 is separated from the first anchor 16 so that the cable 24 does not tangle the mooring of the array 12. The array 12 is free to orient itself normal to any existing current. A platform 28, such as survey ship, transmits commands to the electronics package 20 via the surface buoy 22, and receives data from the electronics package via the surface buoy.

Figure 2:
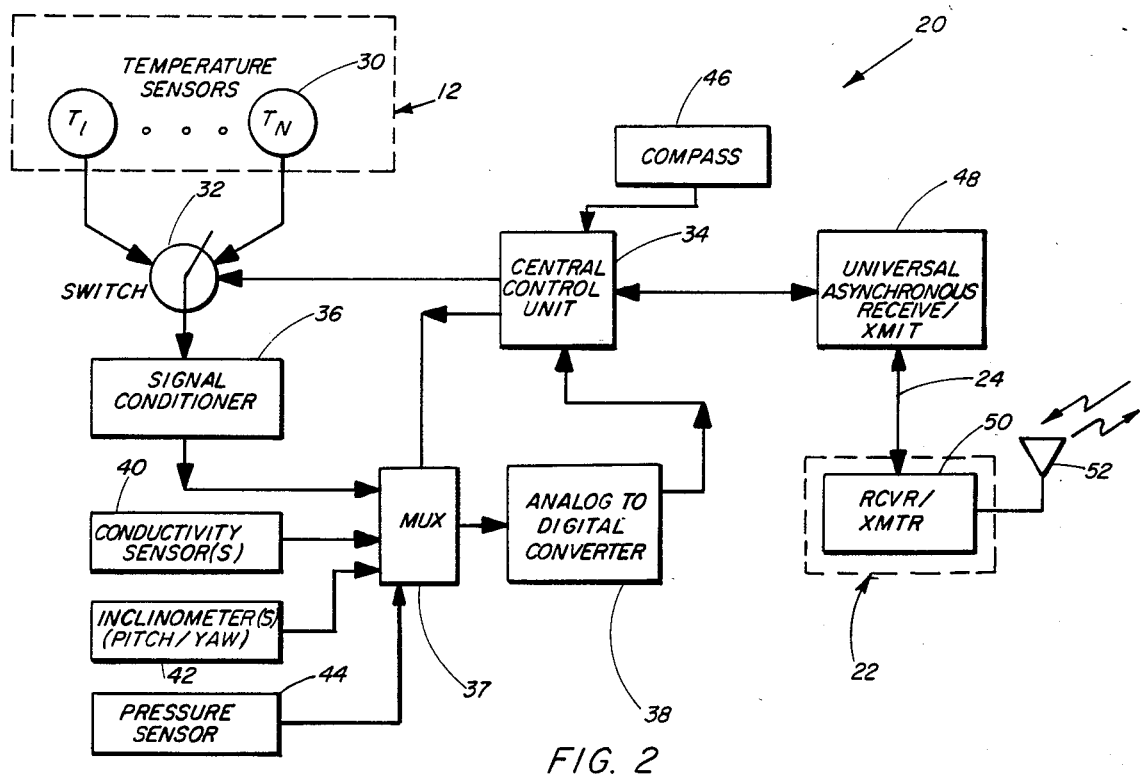
FIG. 2 is a block diagram of the electronic package for the TMMS.
Figure 4D:
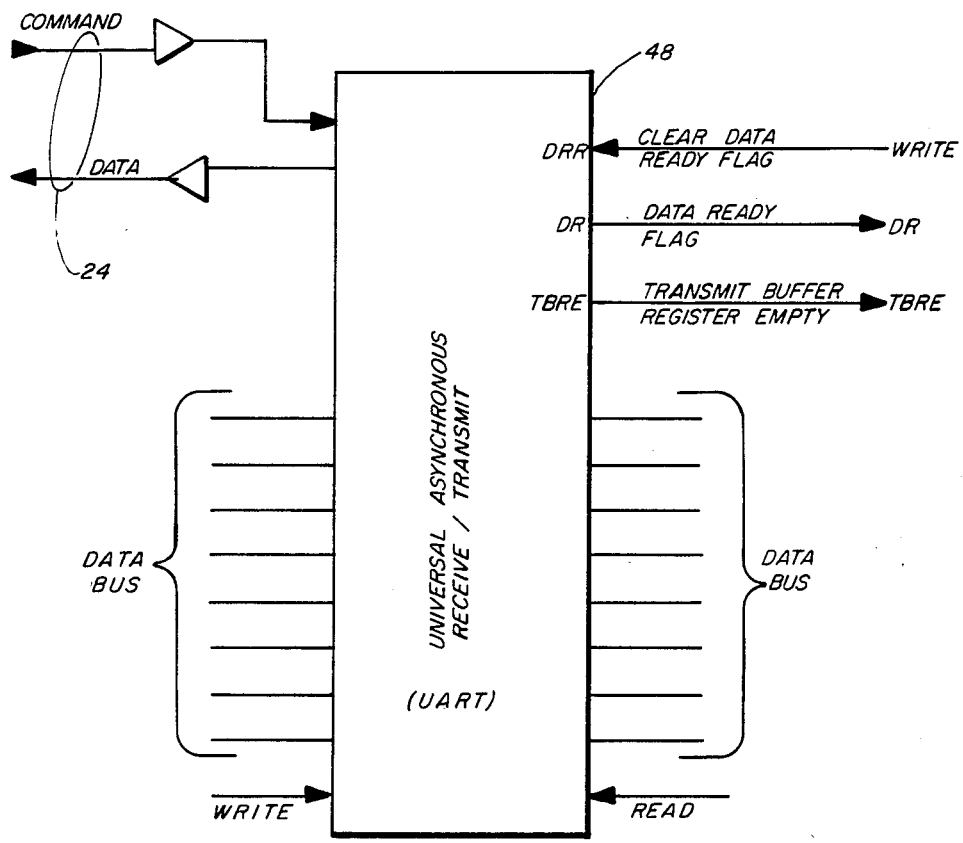
FIG. 4d is a schematic diagram of the asynchronous receive/transmit circuit for the TMMS.

A plurality of temperature sensors 30 form the planar array 12. As shown in FIG. 2 the temperature sensors 30 are input to a switch 32 which samples each sensor sequentially under the control of a central control unit 34. The output from the switch 32 is input to a signal conditioner 36 and thence via a multiplexer 37 to an analog to digital (A/D) converter 38. Also input to the analog to digital converter 38 are the outputs from one or more conductivity sensors 40, inclinometers 42 and a pressure sensor 44 for depth information. The digital data from the analog to digital converter 38 is input to the central control unit 34 together with data from a compass 46 for orientation of the array 12. The data is formatted by the central control unit 34 and transmitted by an asynchronous receiver/transmit circuit (UART) 48 up the cable 24 to a receiver/transmitter 50 in the surface buoy 22 for telemetering to the platform 28 via antenna 52. The antenna 52 receives commands from the platform 28 which are decoded by the receiver/transmitter 50. The output of the receiver/transmitter 50 is forwarded to the central control unit 34 for appropriate action.

Figure 3:
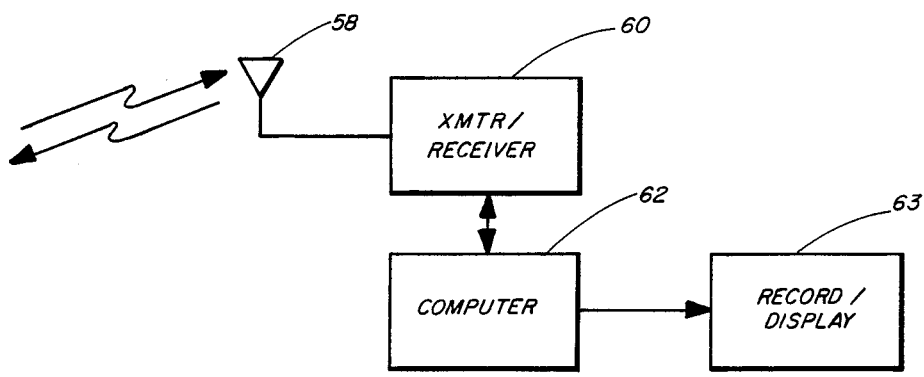
FIG. 3 is a block diagram of the platform electronics for the TMMS.
Figure 4A:
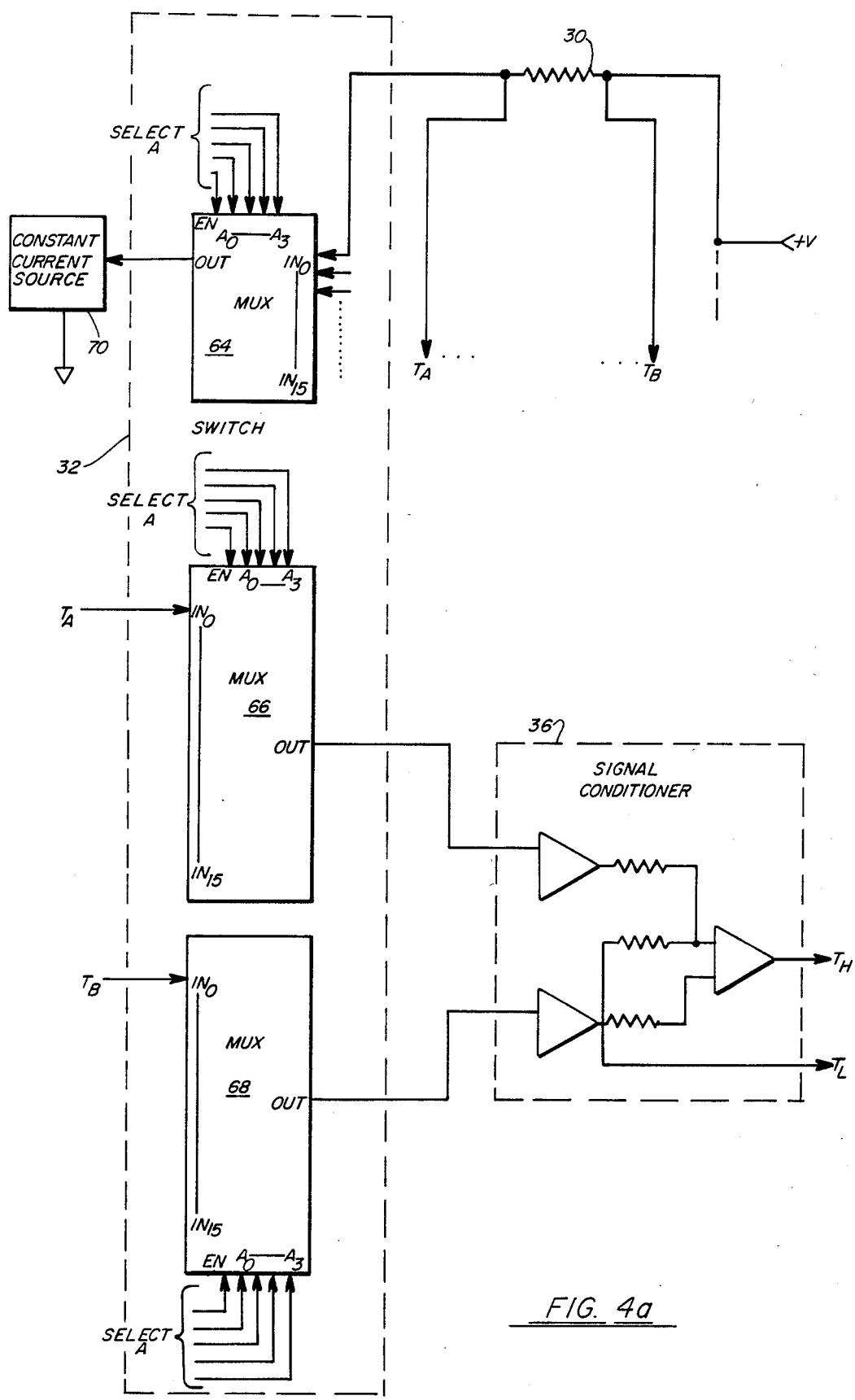
FIG. 4a is a schematic diagram of the thermistor analog circuit for the TMMS.
Figure 4B:
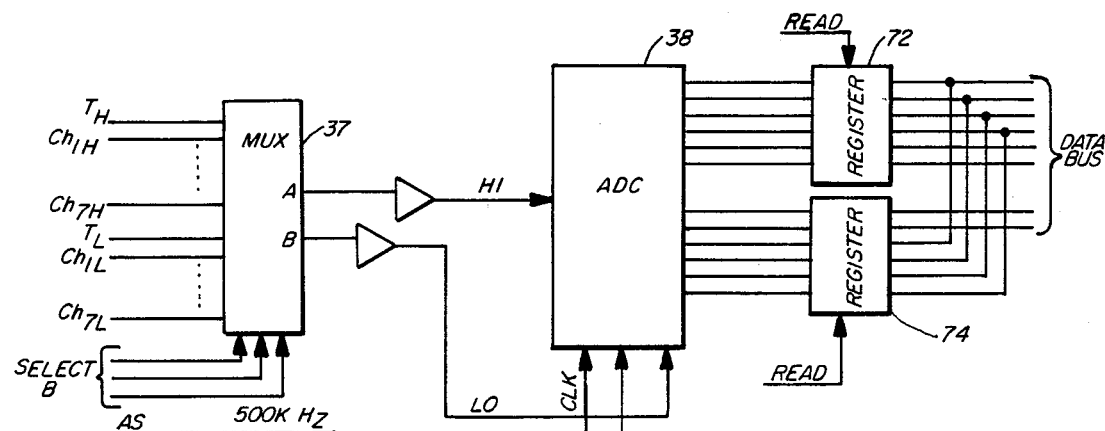
FIG. 4b is a schematic diagram of the analog-to-digital circuit for the TMMS.
Figure 4C:
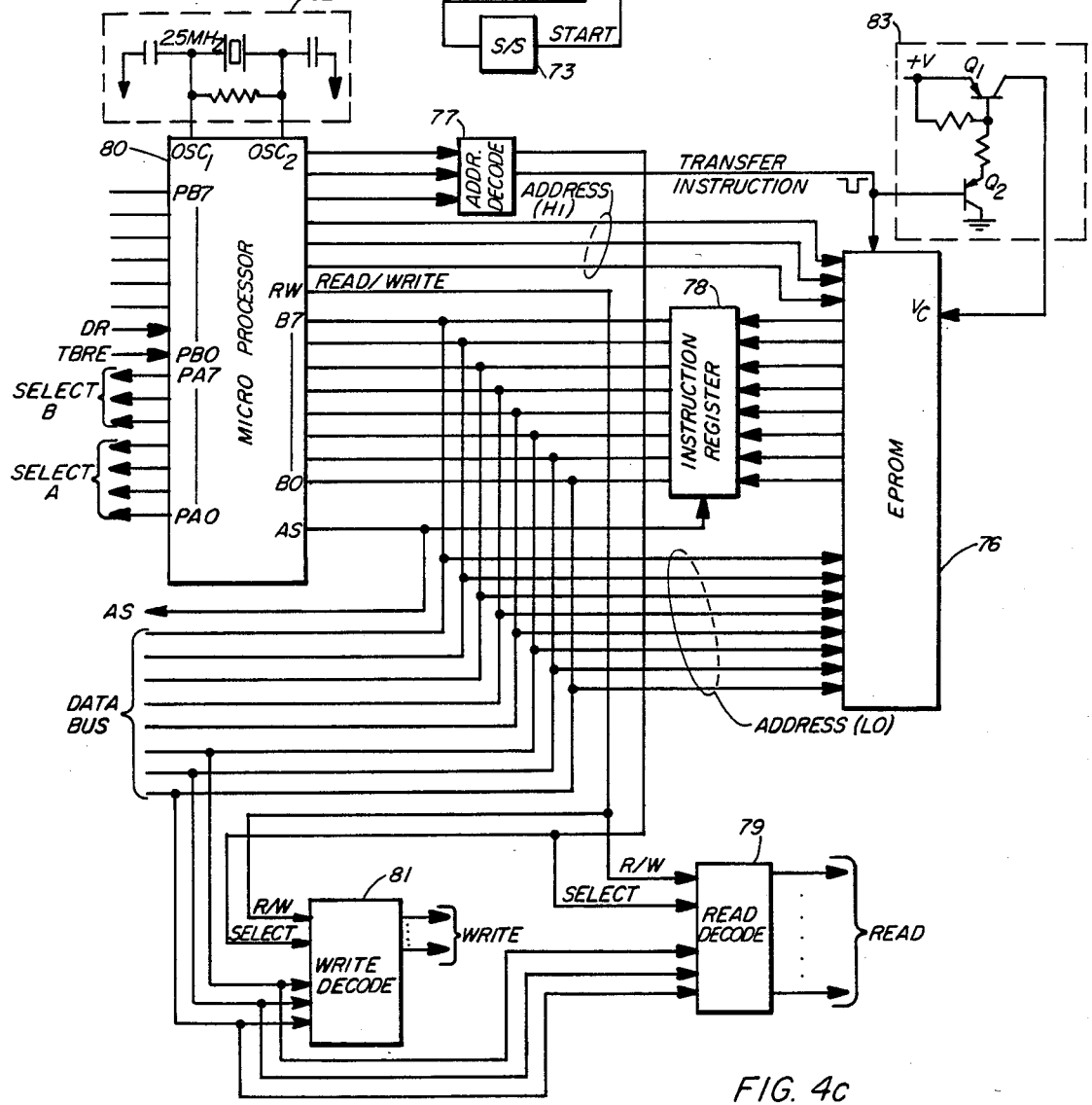
FIG. 4c is a schematic diagram of the central control unit for the TMMS.

On board the platform 28 as shown in FIG. 3 data is received by an antenna 58, decoded by a transmitter/receiver circuit 60 and forwarded to a computer 62 for processing. The processed data is recorded and/or displayed on a record/display unit 63. Commands are generated by the computer 62 and forwarded to the transmitter/receiver circuit 60 for transmission via the antenna 58 to the surface buoy 22.

Referring now to FIGS. 4a–4d the switch 32 is a plurality of multiplexers 64, 66 and 68 which are addressed simultaneously by a SELECT A command from the central control unit 34. Each thermistor 30 has four leads—two to provide a constant current path and two to sample the voltage across the thermistor. A constant current source 70 presents to each thermistor 30 in sequence via the first multiplexer 64 a constant current which produces a voltage across the selected thermistor, $T_A$–TB, which varies according to the temperature of the fluid medium in which the thermistor is located, i.e., the ocean 10. Each side of the thermistor 30 is input to its respective multiplexer, $T_A$ to the second multiplexer 66 and $T_B$ to the third multiplexer 68. The sensed voltage is output to the signal conditioner 36 to provide a high and low analog signal, $T_H$ and $T_L$, normalized to the appropriate voltage range for input to A/D converter 38.

The analog voltage from the signal conditioner 36 together with analog voltages from the conductivity sensor 40, inclinometers 42 and pressure sensor 44 are input to the A/D multiplexer 37. A SELECT B command from the central control unit 34 determines which input is forwarded to the A/D converter 38 for digitization. An address sequence (AS) signal from the central control unit 34 is input to a countdown register 69 which is started by a pulse 67 from a single-shot multivibrator 71. A WRITE command from the central control unit 34 initiates the multivibrator 71. A second single-shot multivibrator 73 is initiated by the first CLK pulse from register 69 to provide a START signal to the A/D converter 38. After twelve cycles the A/D converter 38 automatically turns itself off until the next sample via the A/D multiplexer 37 is to be digitized. The registers 72, 74 upon a READ command from the central control unit 34 clock the data onto an 8-bit DATA BUS where an 8-bit microprocessor is being used.

The DATA BUS carries data from the A/D converter 38 and digital data from the compass 46 according to which data source is selected by the central control unit 34. The central control unit 34 has an EPROM 76, an instruction register 78 and microprocessor 80, shown as an 8-bit microprocessor although a 16-bit microprocessor could also be used. A crystal controlled oscillator 82 provides the timing for the microprocessor 80. The microprocessor 80 monitors the status of the UART 48 to determine, if in idle mode, whether a command from the platform 28 has been received or whether the UART is ready to receive data for transmission. If in the idle mode and a command is received, the microprocessor 80 powers up the TMMS electronics package 20 and begins acquiring data. Once the power is on the microprocessor 80 will call for an instruction from the EPROM 76, which instruction will be stored in the instruction register 78 until the microprocessor is ready to execute it, the next instruction being then transferred to the instruction register upon receipt of a TRANSFER command from the microprocessor. The address sequence (AS) signal clocks the instructions from the instruction register 78 to the microprocessor 80. An address decoder 77 together with a read decoder 79 and a write decoder 81 serve to insure that only one device has access to the DATA BUS at any one time to prevent DATA BUS conflict. The output of the address decoder 77 provides a read/write enable signal to the read/write decoders 79, 81 and a TRANSFER command to the EPROM 76 to transfer the instruction identified by the ADDRESS lines from the microprocessor 80 to the instruction register 78. Since the EPROM 76 is a major source of power drain, to extend the life of the batteries in the TMMS and thus prolong the useful life, an automatic power off circuit 83 is also activated by the TRANSFER signal. The negative going TRANSFER signal turns on transistor Q2 which grounds the base of transistor Q1. The grounding of the base of transistor Q1 applies a voltage to the EPROM 76. The TRANSFER signal is negative long enough to allow transfer of the addressed instruction to the instruction register 78, and then transistor Q2 and in turn transistor Q1 are turned off to remove power from the EPROM 76.

Finally, the asynchronous receive/transmit circuit 48 receives serial command data via cable 24, sets the DATA READY flag, and outputs the command data onto the DATA BUS in parallel upon receiving a READ command from the microcessor 80. Data for transmission is input to the UART 48 via the DATA BUS when the transmit buffer register is empty upon receipt of a WRITE command from the microprocessor 80. The data is converted from parallel to serial and output via the cable 24 for transmission to the surface buoy 22 and thence via telemetry to the platform 28.

Figure 5:
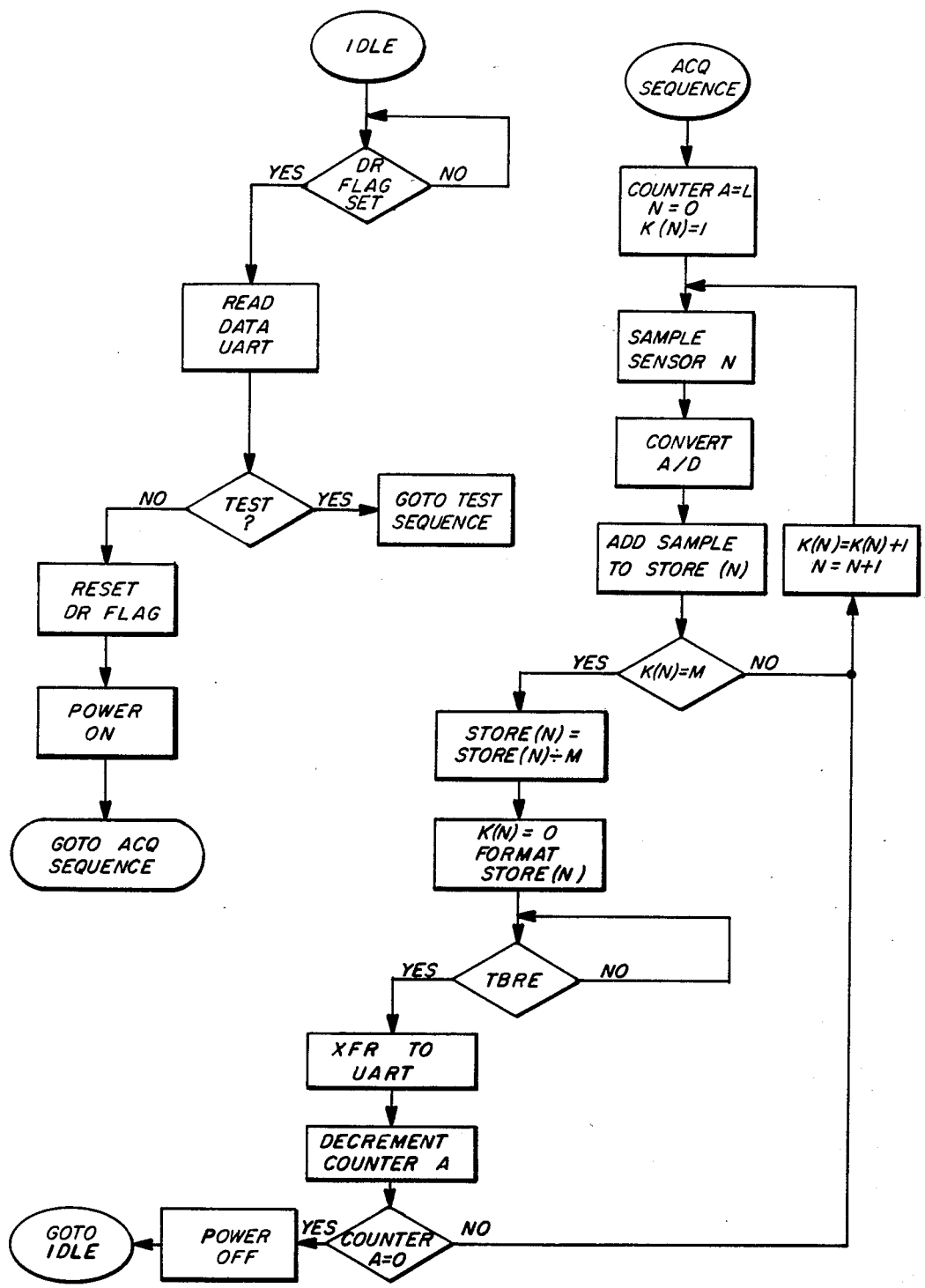
FIG. 5 is a flow chart for the operation of the TMMS according to the present invention.

In operation as shown in FIG. 5 once deployed the TMMS is in an idle state. The microprocessor 80 constantly monitors the DATA READY flag at the UART 48 until a command is received. The command is read by the microprocessor 80 and the DATA READY flag is reset. If the command is a test command, the microprocessor 80 goes to a test sequence. Otherwise, the power is turned on to the TMMS electronics package 20 and the microprocessor 80 enters the data acquisition cycle.

After initialization the microprocessor 80 samples each sensor in sequence, converts the data to digital where the data is in analog form, and stores the data until m samples have been collected. The average of the m samples is then formatted for transmission, and when the transmission buffer register in the UART 48 is empty the data is transferred to the UART. The UART 48 automatically clocks the data serially to the buoy 22 for telemetry transmission. After each transfer to the UART 48 a counter is decremented until the counter reaches zero, and the microprocessor 80 continues the acquisition cycle. When the counter reaches zero, the microprocessor 80 turns the power off and returns to the idle state until the next data command is received.

Thus, the present invention provides a thermal microstructure measurement system which is autonomous and provides data from multiple sensors over a period of time so that a three-dimensional view of the current flow in which the TMMS is located is obtained.

What is claimed is:

1. A system for measurement of the thermal microstructure of water currents, said system comprising:
   a planar array having a plurality of thermistors said planar array being maintained normal to a current flow in a body of water, each of said thermistors having at least one current lead and at least one voltage lead;
   an electronics package connected to said planar array;
   means in said electronics package for sequentially sampling each of said plurality of thermistors;
   means in said electronics package for converting data from said thermistors from analog to digital data;
   means in said electronics package for processing said digital data and for controlling said sampling and converting means;
   a surface buoy floating on said body of water;
   cable means, interconnecting said electronics package and said surface buoy, for transmitting said digital data from said electronics package to said surface buoy and for receiving commands from said surface buoy;
   means on said surface buoy for telemetering said digital data from said surface buoy to a remote platform and for receiving telemetered commands from said remote platform;

means mounted on said planar array for sensing the conductivity of said fluid medium, the output of said conductivity sensing means being input to said converting means;

means mounted on said planar array for determining the inclination of said planar array, the output of said inclination determining means being input to said converting means;

means for sensing the pressure of said fluid medium from which the depth of said planar array is determined, the output of said pressure sensing means being input to said converting means;

means for determining the direction said planar array is facing, the output of said direction determining means beng input to said processing and controlling means; and means for selecting under the control of said processing and controlling means which one of said conductivity sensing means, said inclination determining means, said pressure sensing means, said direction determining means and said thermistors is input to said converting means at any particular instant.

2. A thermal microstructure measurement system as recited in claim 1 wherein said sampling means comprises:

a first multiplexer having an output and a plurality of inputs, said thermistors being connected one of each of said inputs by one of the current leads;

a constant current source connected to said output such that a constant current flows through the one of said thermistors connected to said first multiplexer which is selected by said processing and controlling means;

a second multiplexer having a plurality of inputs to which one of the voltage leads are connected, said second multiplexer having a first section to which a first one of said voltage leads is connected and a second section to which the other one of said voltage leads is connected, the pair of said voltage leads selected by said processing and controlling means corresponding to said thermistor selected from said first multiplexer; and means for conditioning the voltage output from said second multiplexer prior to input to said converting means.

3. A thermal microstructure measurement system as recited in claim 2 wherein said converting means comprises:

a converter multiplexer having a plurality of inputs to which the outputs of said conditioning means, said conductivity sensing means, said inclination determining means and said pressure sensing means are connected, the one selected being controlled by said processing and controlling means;

a data bus; and an analog-to-digital converter connected to the output of said converter multiplexer to convert the voltage output from said converter multiplexer into a parallel digital output, said parallel digital output from said analog-to-digital converter being output onto said data bus.

4. A thermal microstructure measurement system as recited in claim 3 wherein said processing and controlling means comprises:

a program memory connected to said data bus;

a microprocessor connected to said data bus and having command line outputs connected to said multiplexers; and an instruction register connected on one side to said program memory and on the other side to said data bus so that an instruction from said program memory is held until said microporcessor is ready to execute it.

5. A thermal microstructure measurement system as recited in claim 4 wherein said transmitting means comprises an asynchronous receive/transmit circuit connected by a cable to said surface buoy and connected to said data bus such that a read command from said microprocessor causes data received by said telemetering and receiving means on said surface buoy and transmitted via said cable to said asynchronous receive/transmit circuit to be output onto said data bus, and a write command from said microprocessor causes data to be input from said data bus to said asynchronous receive/transmit circuit for transmission via said cable to said telemetering and receiving means on said surface buoy.

6. A thermal microstructure measurement system as recited in claim 5 wherein said processing and controlling means further comprises means for automatically turning off said program memory between instruction requests from said microprocessor.

* * * * *